(12) United States Patent
Zhang et al.

(10) Patent No.: US 8,213,870 B2
(45) Date of Patent: Jul. 3, 2012

(54) BEAMFORMING USING PREDEFINED SPATIAL MAPPING MATRICES

(75) Inventors: Hongyuan Zhang, Sunnyvale, CA (US); Rohit U. Nabar, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 572 days.

(21) Appl. No.: 12/251,834

(22) Filed: Oct. 15, 2008

(65) Prior Publication Data
US 2009/0097395 A1 Apr. 16, 2009

Related U.S. Application Data

(60) Provisional application No. 60/980,036, filed on Oct. 15, 2007.

(51) Int. Cl.
*H04B 1/00* (2006.01)
(52) U.S. Cl. ........... 455/63.4; 370/249; 455/42; 455/59; 455/60; 455/63.1; 455/69
(58) Field of Classification Search .......... 370/203, 370/206, 241, 248, 249, 252; 455/73, 550.1, 455/561, 562.1, 39, 42, 43, 44, 45, 59, 60, 455/63.1, 63.4, 68, 69
See application file for complete search history.

(56) References Cited

U.S. PATENT DOCUMENTS

| 7,995,528 | B1 | 8/2011 | Cendrillon | |
|---|---|---|---|---|
| 2005/0063378 | A1* | 3/2005 | Kadous | 370/389 |
| 2006/0190245 | A1* | 8/2006 | Iser et al. | 704/219 |
| 2006/0209980 | A1 | 9/2006 | Kim | |
| 2007/0005749 | A1* | 1/2007 | Sampath | 709/223 |
| 2007/0049218 | A1* | 3/2007 | Gorokhov et al. | 455/102 |
| 2007/0155336 | A1 | 7/2007 | Nam et al. | |
| 2007/0189148 | A1* | 8/2007 | Garmonov et al. | 370/204 |
| 2007/0206504 | A1* | 9/2007 | Koo et al. | 370/245 |
| 2007/0249402 | A1 | 10/2007 | Dong et al. | |
| 2008/0004076 | A1 | 1/2008 | Adachi et al. | |
| 2008/0080637 | A1 | 4/2008 | Khan et al. | |
| 2008/0117867 | A1 | 5/2008 | Yin et al. | |

(Continued)

FOREIGN PATENT DOCUMENTS
WO WO-0129986 4/2001
(Continued)

OTHER PUBLICATIONS

"Partial International Search", Application Serial No. PCT/US2008/011805, (May 8, 2009), 6 pages.
(Continued)

*Primary Examiner* — Chi Pham
*Assistant Examiner* — Weibin Huang

(57) ABSTRACT

Systems and methods for transmitting packets to a receiver. In an implementation, the method includes storing, in a memory, a plurality of predefined spatial mapping matrices for use in a transmission of one or more packets to a receiver; sequentially transmitting one or more packets to the receiver, in which each of the sequential transmissions of one or more packets comprises using a different one of the plurality of predefined spatial mapping matrices stored in the memory; and selecting one of the plurality of predefined spatial mapping matrices stored in the memory for use in a subsequent transmission of one or more packets to the receiver, in which the selection of the one of the plurality of predefined spatial mapping matrices for use in the subsequent transmission is based on a quality of reception of the one or more data packets transmitted in each of the sequential transmissions.

21 Claims, 9 Drawing Sheets

U.S. PATENT DOCUMENTS

| | | |
|---|---|---|
| 2008/0219373 A1 | 9/2008 | Zhang et al. |
| 2008/0292012 A1 | 11/2008 | Kim et al. |
| 2008/0299917 A1 | 12/2008 | Alexiou et al. |
| 2009/0129286 A1 | 5/2009 | Beser |
| 2009/0310586 A1 | 12/2009 | Shatti |

FOREIGN PATENT DOCUMENTS

| | | |
|---|---|---|
| WO | WO-2006138337 | 12/2006 |
| WO | WO-2009051748 | 4/2009 |

OTHER PUBLICATIONS

Heath, R W J., et al., "Limited Feedback Unitary Precoding for Spatial Multiplexing Systems", *IEEE*, Transactions on Information Theory, IEEE, US, vol. 51, No. 8. XP011136349, ISSN: 0018-9448 the whole document,(Aug. 1, 2005),pp. 2967-2976.

"Preliminary Report on Patentability and Written Opinion", Application No. PCT/US2008/011805, (Apr. 29, 2010), 9 pages.

"Advisory Action", U.S. Appl. No. 12/167,788, (Feb. 3, 2011), 3 pages.

"Final Office Action", U.S. Appl. No. 12/167,788, (Oct. 26, 2010), 25 pages.

"Non-Final Office Action", U.S. Appl. No. 12/167,788, (Mar. 30, 2010), 20 pages.

"Notice of Allowance", U.S. Appl. No. 12/167,788, (Mar. 21, 2011), 7 pages.

"PCT Search Report", Application No. PCT/US2008/011805, 25 pages, (Jan. 7, 2009).

"Part 11: Wireless LAN Medium Access Control (MAC) and Physical Layer (PHY) specifications", *IEEE Std 802.11a-1999*, High-speed Physical Layer in the 5 GHz Band,(1999),1-91.

"Part 11: Wireless LAN Medium Access Control (MAC) and Physical Layer (PHY) specifications", *IEEE Std 802.11b-1999/Cor 1-2001*, Amendment 2: Higher-speed Physical Layer (PHY) extension in the 2.4 GHz band,(Nov. 7, 2001),1-23.

"Further Higher Data Rate Extension in the 2.4 GHz Band", *IEEE P802.11g/D8.2*, DRAFT Supplement to STANDARD [for] Information Technology,(Apr. 2003),1-69.

Mujtaba, Syed A., "TGn Sync Proposal Technical Specification", *IEEE 802.11-04/0889r6*, This document presents the technical specification for the MAC and the PHY layer of the TGn Sync proposal to IEEE 802.11 TGn,(May 18, 2005),1-131.

Zhang, Hongyuan et al., "Method and Apparatus for Transmit Beamforming", U.S. Appl. No. 12/059,846, 1-62, (Mar. 31, 2008).

* cited by examiner

BEAMFORMING USING PREDEFINED SPATIAL MAPPING MATRICES

RELATED APPLICATIONS

This application claims priority to U.S. Provisional Application Ser. No. 60/980,036, filed on Oct. 15, 2007, the disclosure of which is incorporated by reference herein in its entirety.

BACKGROUND

A multiple-input multiple-output (MIMO) wireless communication system may utilize multiple antennas at both a transmitter and a receiver to transmit and receive data and to improve the range and performance of the system. Data packets can be independently and simultaneously transmitted using separate data signals in parallel using separate MIMO channel subcarriers on different transmission antennas. At each receiver antenna, the independent data packets may be combined and the receiver may recover the separate data signals with a decoder. Data transmitted and received using a MIMO system may be modulated using orthogonal frequency division multiplexing (OFDM) or other modulation schemes. Examples of MIMO-OFDM systems include wireless local area networking using the IEEE 802.11n standard, wireless metropolitan area networking using the IEEE 802.16e/j/m standards, mobile phone communications using the 3GPP LTE standard, and other systems.

In a MIMO system, the transmitter may utilize channel state information of a channel subcarrier to perform beamforming. Beamforming is a technique that can increase the directivity of transmitted data packets and the signal-to-noise ratio gain at a receiver. Traditionally, channel state information is maintained by the transmitter using explicit beamforming, where the transmitter sends a sounding packet to the receiver, and in response the receiver feeds back information to the transmitter regarding characteristics of a channel that was used to send the sounding packet. However, this traditional technique may incur system overhead and sacrifice throughput.

SUMMARY

This Summary is provided to introduce subject matter that is further described below in the Detailed Description and Drawings. Accordingly, the Summary should not be considered to describe essential features nor used to limit the scope of the claimed subject matter.

In an implementation, one of a plurality of predefined spatial mapping matrices is selected for use in a transmission of one or more data packets to a receiver. Another one of the plurality of predefined spatial mapping matrices is selected when a quality of reception of the one or more data packets in the transmission is less than a defined quality metric.

In an implementation, a sounding packet is transmitted using beamforming from a transmitter for receipt by a receiver. A channel estimate is received from the receiver responsive to the sounding packet. A beamformed channel is formed by the transmitter based on the received channel estimate.

In an implementation, an apparatus comprises one or more antennas, memory to maintain a codebook having a plurality of predefined spatial mapping matrices, and one or more modules. The one or more modules are configured to cause one or more data packets to be transmitted by the one or more antennas in a first transmission using one of the plurality of predefined spatial mapping matrices. The one or more modules are also configured to select another one of the plurality of predefined spatial mapping matrices to transmit the one or more data packets in a second transmission when a quality of reception of the one or more data packets in the first transmission is less than a defined quality metric.

In an implementation, an apparatus comprises one or more antennas, memory to maintain a codebook having a plurality of predefined spatial mapping matrices, and one or more modules. The one or more modules are configured to cause the one or more antennas to directionally transmit a sounding packet to a receiver using one of the plurality of predefined spatial mapping matrices and form a beamformed channel based on a channel estimate obtained from the receiver.

In an implementation, a system comprises one or more modules to directionally transmit data packets using different predefined spatial mapping matrices that correspond to different directions, respectively, until a quality of reception of the one or more data packets meets a defined quality metric.

In an implementation, a system comprises one or more modules to cause a sounding packet to be transmitted using beamforming for receipt by a receiver and a beamformed channel to be formed based on a channel estimate received from the receiver responsive to the sounding packet.

BRIEF DESCRIPTION OF THE DRAWINGS

The same numbers are used throughout the drawings to reference like features.

DETAILED DESCRIPTION

Overview

Figure 1:
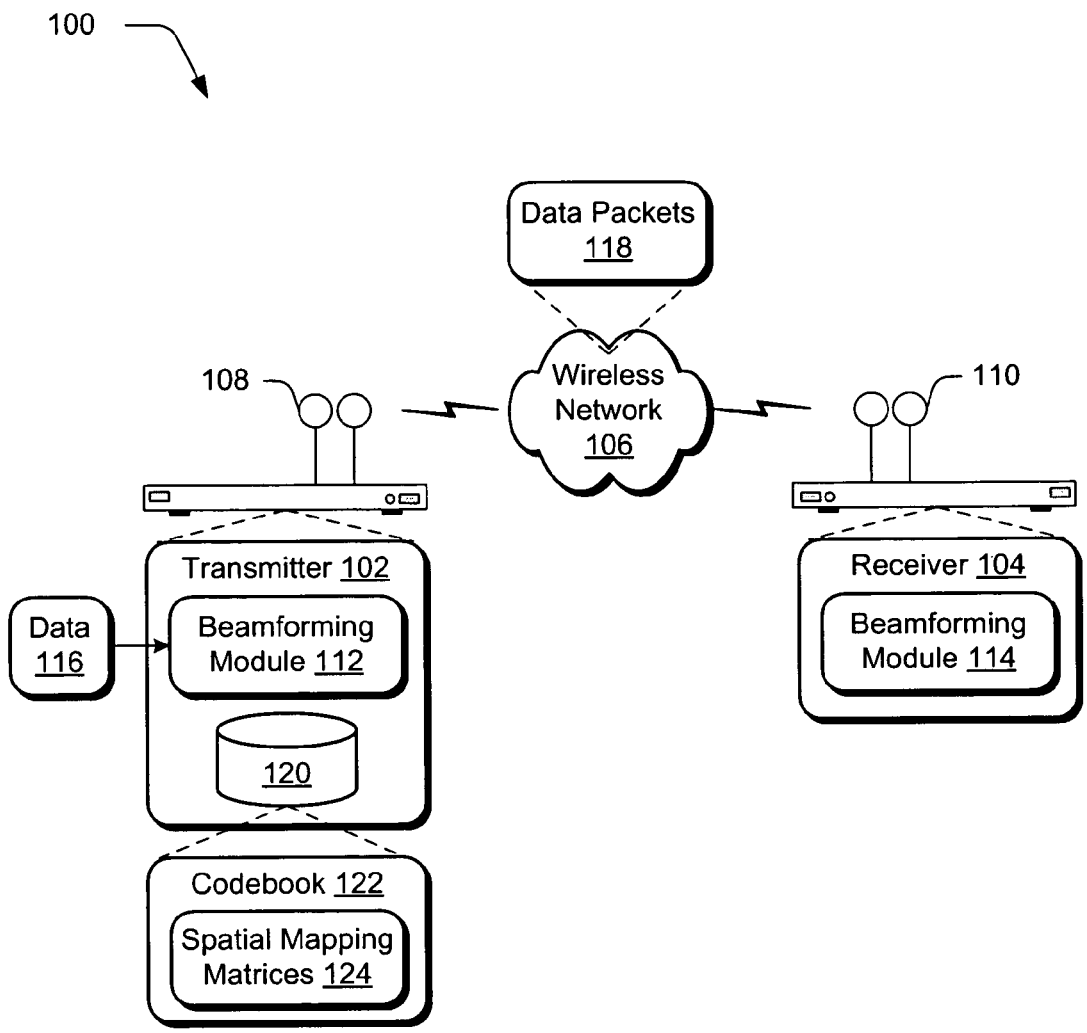
FIG. 1 illustrates an example wireless system implementing a codebook having a plurality of predefined spatial mapping matrices.

Traditional beamforming by a transmitter was based on channel state information (CSI) obtained using a sounding procedure. For example, in one of the traditional sounding procedures, a sounding packet was communicated from a transmitter to a receiver. The receiver then calculated a channel estimate (H) that described characteristics of the channel used to communicate the sounding packet. The channel estimate (H) was then provided to the transmitter to form channels that were to employ the beamforming techniques, such as to determine a steering matrix ($Q_{steer}$). The steering matrix ($Q_{steer}$) was used to map particular data to particular transmit antennas in light of the channel estimate (H) and directionally transmit the data. Channels that employ beamforming techniques may also be referred to hereafter as beamformed channels.

However, the sounding packet that was used to form channels using traditional techniques was not steered as would be the case in channels that employ beamforming techniques. For example, the sounding packet was traditionally transmitted using a spatial mapping matrix (Q) that was not directional. Subsequent data packets, however, were directionally transmitted via a beamformed channel that was formed using a steering matrix ($Q_{steer}$). Accordingly, the sounding packet may have an effective transmission range that is less than an effective transmission range of a beamformed channel. Thus, the effective communication range of the sounding packet may limit traditional beamforming techniques at ranges that extend past the effective communication range of the sounding packet.

Further, traditional sounding procedures delayed communication of data until the beamformed channel was formed. For example, the data was not traditionally communicated until after the sounding procedure was performed and the steering matrix was calculated to take into account the channel estimate (H). Thus, traditional beamforming techniques were inefficient and caused additional overhead to systems that employed these techniques.

Beamforming techniques using predefined spatial mapping matrices are described. In an implementation, a spatial mapping matrix (Q) is selected from a codebook having a plurality of predefined spatial mapping matrices (Q) to form a beamformed channel to communicate data packets. The selection may be based on a variety of factors, such as a number of errors encountered using a particular one of the spatial mapping matrices from the codebook when communicating data.

For instance, a threshold may be used to define an acceptable number of errors that are considered permissible when communicating data via a beamformed channel. When this threshold is exceeded for a particular spatial mapping matrix (Q) that was used to form the beamformed channel, a different spatial mapping matrix (Q) may be chosen from the codebook. In this way, the transmitter may hop between spatial mapping matrices until a matrix is found having an acceptable quality of reception. Additionally, this hopping may be performed without channel training, e.g., without a sounding procedure. Thus, the spatial mapping matrix may be selected without the transmitter knowing the particular characteristics of the channel as viewed by the receiver, e.g., the channel estimate (H) as previously described.

In an implementation, the spatial mapping matrices may be hopped based on transmittal of data packets and not control packets, e.g., the sounding packet previously described. Thus, the data may be communicated without a delay that was encountered using traditional sounding procedures. In other words, the data packet itself may act as a sounding packet, both for that data packet (such as for a re-transmittal) as well as subsequent data packets to be communicated by the transmitter.

In the following discussion, an example environment and an implementation example are first described that is operable to utilize beamforming techniques that employ predefined spatial mapping matrices. Example procedures are then described which may be employed by the environments, as well as other environments. Thus, implementation of the procedures is not limited to the environments and vice versa.

Example Environment

FIG. 1 illustrates an example wireless system 100 implementing a codebook having a plurality of predefined spatial mapping matrices. The wireless system 100 includes a transmitter 102 and a receiver 104 that are configured to communicate with one another via a wireless network 106. The transmitter 102 is illustrated as including a plurality of antennas 108. Likewise, the receiver 104 is also illustrated as including a plurality of antennas 110. The wireless network 106 may be representative of a variety of wireless networks, such as multiple input, multiple output (MIMO) networks, networks that comply with IEEE 802.11 (e.g., 802.11n/g/a/b), WiMAX networks, cellular networks (e.g., 3GPP LTE) and others that employ multiple antennas.

The transmitter 102 and the receiver 104 are further illustrated as including respective beamforming modules 112, 114 that are representative of functionality of the respective apparatuses to employ beamforming techniques using the respective antennas 108, 110. Beamforming is a technique that utilizes multiple antennas to provide directional communication. For example, the beamforming module 112 is illustrated as receiving data 116, which may originate within the transmitter 102 (such as by an application executing on a processor of the transmitter 102) and/or outside the transmitter 102, such as from a computer that employs the transmitter 102 as a stand-alone device. Consequently, the data 116 may take a variety of forms, such as voice data, application data, music, and so on.

Upon receipt of the data 116, the beamforming module 112 may form data packets 118, each including a portion of the data, to be communicated over the wireless network 106 to the receiver 104. In another example, the data 116 is already in the form of packets. Beamforming techniques may be used by the beamforming module 112 such that directionality of the communication of the data packets 118 is utilized. Directionality may be used for a variety of purposes, such as to extend a range and/or reliability of the communication between the transmitter 102 and the receiver 104. For example, the beamforming techniques may be used to control a phase and a relative amplitude of signals transmitted using each of the antennas 108. The changes to phase and relative amplitude of the signals may result in a corresponding change to directionality of the signals as a whole by taking advantage of constructive and/or destructive interference of the signals. The interference, both constructive and destructive, may be used to extend an effective transmission range (distance) of the signal. Further discussion of beamforming techniques in a MIMO system may be found in relation to FIG. 3.

As previously described, a sounding procedure was utilized in traditional beamforming techniques to derive channel state information (CSI). The channel state information was then used to generate a steering matrix that was utilized to form the beamformed channel. However, traditional techniques did not steer the sounding packet. For example, a traditional spatial mapping matrix used to transmit the sounding packet was not directional. Consequently, the sounding packet could have an effective transmission range that was less than an effective transmission range of a subsequent beamformed channel formed by the sounding packet.

In an implementation, the transmitter 102 includes memory 120 that maintains a codebook 122 having a plurality of predefined spatial mapping matrices 124. Each of the spatial mapping matrices 124 may be configured to have different characteristics. Consequently, the beamforming module 112 may hop from one of the spatial mapping matrices 124 to another to communicate packets (e.g., control packets, data packets, or other types of packets) over the wireless network 106.

For example, the beamforming module 112 may initiate a sounding procedure to obtain channel state information (CSI). The beamforming module 112 may then form a sounding packet and select one of the plurality of spatial mapping matrices 124 to communicate the sounding packet using beamforming techniques. When the beamforming module 112 receives an acknowledgement (e.g., ACK, information describing the channel estimate, and so on), communication may continue between the transmitter 102 and the receiver 104 using the selected spatial mapping matrix. However, if an acknowledgement is not received by the transmitter 102, the beamforming module 122 may hop to another spatial mapping matrix 124 in the codebook 122. In this way, the sounding packet may have an effective range that corresponds with that of the beamformed channel, thereby increasing accessibility of the extended range of the beamformed channel.

In an implementation, the codebook 122 of spatial mapping matrices 124 may also be employed to communicate data packets 118. As previously described, communication of data was delayed using traditional beamforming techniques by the sounding procedure because data was not traditionally communicated until formation of the beamformed channel was completed. Thus, traditional beamforming techniques were inefficient and caused additional overhead to systems that employed these techniques. However, in one or more of the beamforming techniques described herein the codebook 122 may be utilized to communicate data between the transmitter 102 and the receiver 104 without channel training (e.g., without performing a sounding procedure). Therefore, the data packets 118 may be communicated with greater efficiency over traditional techniques, further discussion of which may be found in relation to the following figure.

Figure 2:
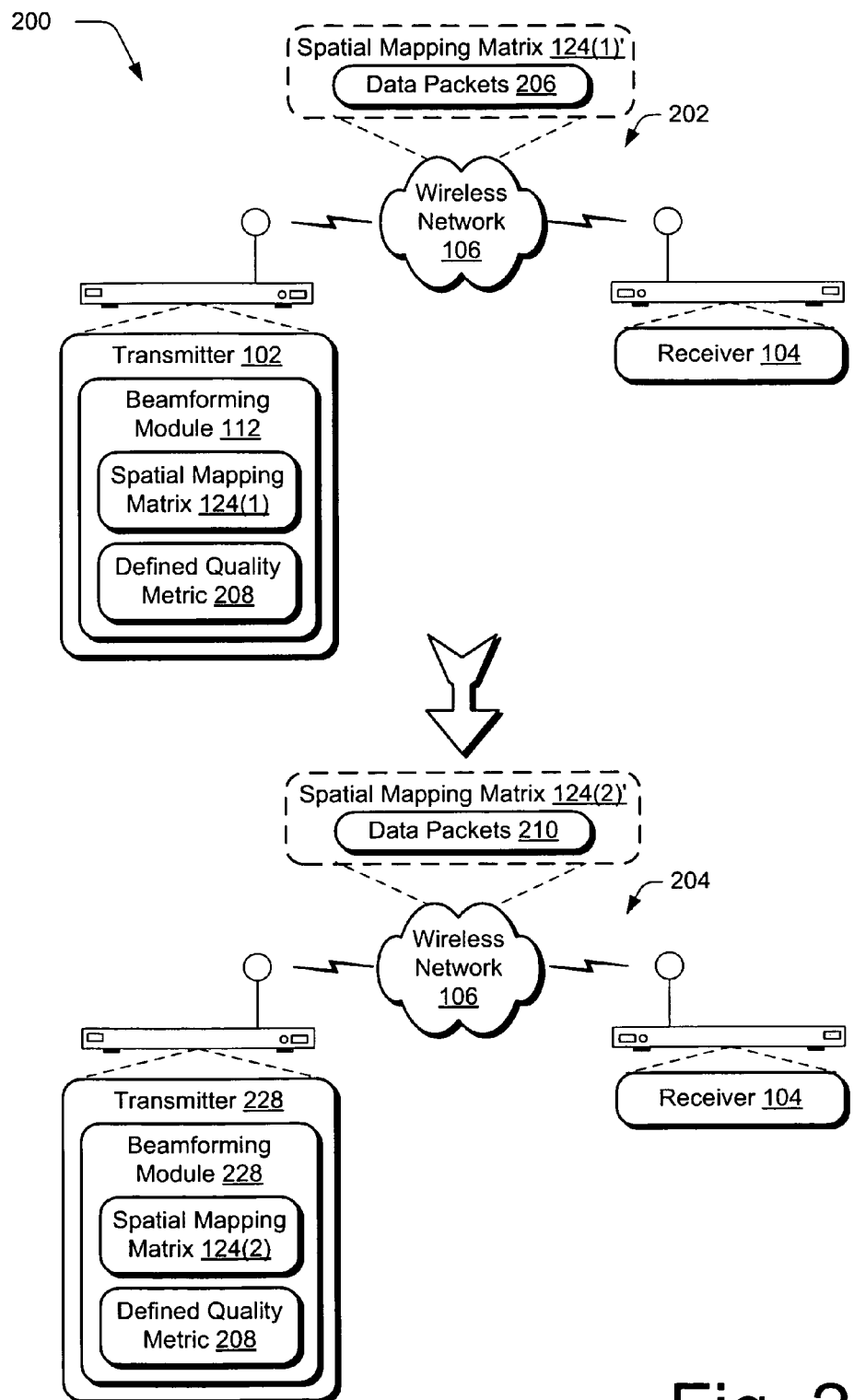
FIG. 2 depicts an example implementation in which first and second instances of use of an example spatial mapping matrix hopping technique are illustrated, the technique employing data to be communicated between a transmitter and a receiver.

FIG. 2 depicts an example implementation in which first and second instances 202, 204 of a use of an example spatial mapping matrix hopping technique is illustrated. Additionally, the spatial mapping matrix hopping technique in this example uses data to be communicated between a transmitter and a receiver, instead of a control packet (e.g., a sounding packet) as was previously utilized in a sounding procedure. At the first instance 202, the beamforming module 112 receives data to be communicated to the receiver 104, such as data from an application that is to be processed and/or output by the receiver 104. Examples of such data are wide ranging and include voice data (e.g., cellular phones), content (e.g., music, television), files (e.g., documents), and so on.

Accordingly, the beamforming module 112 may form data packets 206 to communicate the data. In another example the data packets 206 are formed outside of the beamforming module 112, such as by an originating application. The beamforming module 112 may also select a spatial mapping matrix 124(1) to directionally transmit the data packets 206 to the receiver 104 as previously described. The spatial mapping matrix 124(1) in the first instance 202 of FIG. 2 corresponds to one of the plurality of spatial mapping matrices 124 from the codebook 122 illustrated in FIG. 1. The beamforming module 112 may then cause the data packets 206 to be communicated in compliance with the spatial mapping matrix 124(1), which is illustrated through the use of a phantom spatial mapping matrix 124(1)' around the data packets 206 in FIG. 2.

The beamforming module 112 may then monitor transmission of the data packets 206 to determine whether quality of reception of the data packets 206 complies with a defined quality metric 208. Consequently, the beamforming module 112 may determine whether the spatial mapping matrix 124(1) is suitable to transmit the data packets 206 over the wireless network 106. A variety of different quality metrics may be defined, such as a data rate, packet error rate, and so on.

When the transmission of the data packets 206 does not comply with the defined quality metric 208, the beamforming module 112 may transition to the second instance 204 in which another spatial mapping matrix 124(2) is selected. Continuing with the previous example, spatial mapping matrix 124(2) may be configured to have different characteristics (e.g., directionality) than the spatial mapping matrix 124(1) selected in the first instance 202. This spatial mapping matrix 124(2) may then be used to communicate data packets 210, which is illustrated by the phantom spatial mapping matrix 124(2)' around data packets 210 in FIG. 2. The data packets 210 in the second instance 204 may be the same or different from the data packets 206 in the first instance 202.

In an implementation, this technique may be repeated to hop through the spatial mapping matrices 124 in the codebook 122 until a suitable spatial mapping matrix 124 is found that causes a quality of reception to meet the defined quality metric 208. In another implementation, this technique may continue for each of the spatial mapping matrices 124 in the codebook 122. The spatial mapping matrix that is optimal (e.g., best complies with the defined quality metric 208) may then be selected for use in communicating subsequent data packets. In a further implementation, these techniques may be combined such that an optimal spatial mapping matrix is first selected. The hopping technique may then be repeated when a quality of reception of the data packets becomes less than the defined quality metric 208.

Implementation Example

As previously described, the transmitter 102 traditionally received a signal that described CSI. The CSI then served as a basis to form a beamformed channel. For example, the transmitter 102 may receive a signal as represented by the following equation:

$$y = HQx + n$$

where y is a $N_r \times 1$ received signal vector; x is a transmitted data vector where L is a number of data streams; n is a noise vector; H is a MIMO channel matrix of size ($N_r \times N_t$) where $N_r$ is the number of receiver antennas and $N_t$ is the number of transmit antennas; and Q is a spatial mapping matrix that spreads the L data streams across the $N_t$ transmit antennas. This equation may be used to model one subcarrier of a MIMO-OFDM system or a single-carrier system with frequency-flat fading such that a delay spread is not encountered. With frequency-selective fading in a single carrier system, suitable adjustments may be made to the model to reflect delay spread. However, the general form remains the same, with changes in dimensionality, i.e. time dimension is considered in the equation above.

In transmit beamforming, H was traditionally known at the transmitter 102 by the previously described sounding procedure. Consequently, a steering matrix ($Q_{steer}$) used to form a beamformed channel was based directly on H. However, in a normal unsteered transmission as was typically performed for sounding packets, H was unknown to the transmitter 102. Therefore, in unsteered transmissions Q was blindly determined and typically fixed regardless of H. In the beamforming techniques described herein, the predefined spatial mapping matrices (Q) included a codebook may be hopped. For example, different spatial mapping matrices may be used to transmit different packets respectively, such as spatial mapping matrices having different respective directionality. The hopping may cease when certain criteria are met, such as the defined quality metrics previously described.

In an implementation, the transmitter 102 may hop over a sequence of M spatial mapping matrices 124 (in the codebook 122) for successively transmitted packets. The sequence of spatial mapping matrices may be represented as Q(m), with m being 1 to M. For example, the transmitter 102 may use one of the spatial mapping matrices 124 to map a pre-determined number P of consecutive data packets. After the data packets P have been transmitted, the transmitter 102 (through the beamforming module 122) may assess a quality of reception of the data packets. The quality of reception may be measured in a variety of ways, such as through comparison with a defined quality metric that may reference a threshold packet error rate, data rate, and so on as previously described.

The comparison may then be used to determine whether hopping through the codebook 122 is to continue. For example, the transmitter 102 may decide to hop to a different spatial mapping matrix 124 in the codebook 122 when the quality of reception is less than the predefined quality metric. The transmitter 102 may also decide to remain with a current spatial mapping matrix 124 when the defined quality metric is met. In another example, the hopping may continue until an optimal spatial mapping matrix is found. For instance, the spatial mapping matrix 124 may be considered optimal that best satisfies the defined quality metric when compared with other spatial mapping matrices 124 in the codebook 122.

When the hopping is performed for data packets and not control packets (e.g., sounding packets and other packets that do not include arbitrary data to be transmitted to the receiver 104), the transmitter 102 may continue to monitor the quality of reception. If the quality of reception is less than the defined quality metric (e.g., a threshold packet error rate has been exceeded), then the hopping may be repeated.

When the hopping is performed for sounding packets in a transmit beamforming exchange, the transmitter 102 may continue using a particular spatial mapping matrix 124 until a steering matrix ($Q_{steer}$) is ready to be used. For example, one of the predefined spatial mapping matrices 124 may continue to be used until the steering matrix ($Q_{steer}$) is calculated using CSI, further discussion of which may be found in relation to FIG. 3. In another example, one of the predefined spatial mapping matrices 124 (Q) may be optimal for a current channel matrix H. In other words, the hopping may continue until the spatial mapping matrix (Q) approximates or is equal to a steering matrix $Q_{steer}$ that could have been generated from the CSI.

In the case of mixed-mode 802.11n beamforming (where a packet is composed by a legacy portion and a high-throughput portion, and the beamforming is applied on the high-throughput portion of the packet), the hopped spatial mapping matrix is applied to the legacy portion of the mixed-mode sounding packets, so that the normal transmit beamforming steering matrix calculation (which involves the spatial mapping matrix applied to the high-throughput portion of the sounding packet) is not affected by such hopping. And more generally, the hopping strategy can be used uniformly across the packet or selectively in portions, depending on practicality and design considerations. If the hopping is applied across the whole packet, true steering matrix (Qsteer) computation for the beamforming device may be based on the hopped spatial mapping matrix of the high-throughput portion of the sounding packet.

Example Codebook Design

The codebook 122 may assume a variety of configurations. In a first example, when L=1, elements of the $N_t \times 1$ spatial mapping matrices 124 in the codebook 122 may be designed as phasors with angles equally spread over a unit circle, an example of which is shown in the following equation:

$$Q(m) = [1 \exp(j\theta_{m1}) \exp(j\theta_{m2}) \ldots \exp(j\theta_{m(N_t-1)})]^T$$

In another example, the hopping technique is performed for sub-matrices of an $N_t \times N_t$ unitary matrix, e.g., a DFT matrix or Hadamard matrix. Selection of an optimal sub-matrix of a unitary matrix may achieve a sizeable transmit beamforming gain. Accordingly, the hopping techniques may be utilized to determine an optimal sub-matrix for a given channel. A unitary matrix Q has the following property, $Q^H Q = I$.

Figure 3:
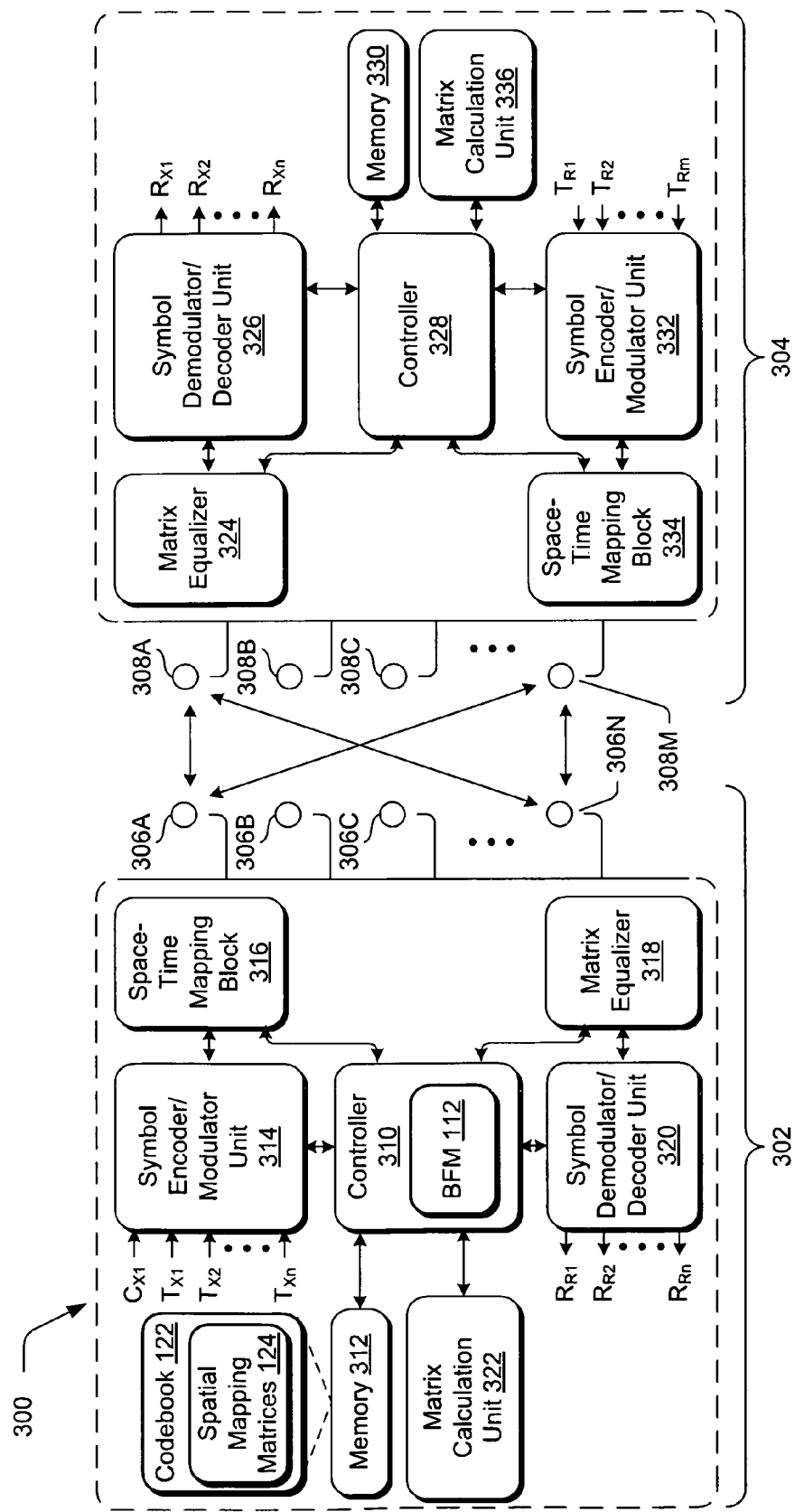
FIG. 3 illustrates an example multiple input, multiple output (MIMO) system configured to implement beamforming using a codebook of spatial mapping matrices as well as techniques that use channel state information in accordance with one or more embodiments.

FIG. 3 illustrates an example multiple input, multiple output (MIMO) system 300 configured to implement beamforming using a codebook of steering matrices as well as techniques that use CSI in accordance with one or more embodiments. In the following discussion of FIG. 3, techniques are first described that may be used to generate a steering matrix based on CSI. These techniques may be used in conjunction with the predefined spatial mapping matrix techniques previously described, such as in conjunction with a sounding packet used to form a beamformed channel.

The MIMO communication system 300 as illustrated includes a transmitter 302 and a receiver 304 that may be the same as or different from the transmitter 102 and the receiver 104 of FIGS. 1 and 2, respectively. The transmitter 302 includes multiple transmission antennas 306A-306N, and the receiver 304 includes multiple receiver antennas 308A-308M. The number of transmission antennas 306A-306N may be the same as, more than, or less than the number of receiver antennas 308A-308M.

As shown in FIG. 3, the transmitter 302 includes a controller 310 coupled to a memory 312, a symbol encoder/modulator unit 314 and a space-time mapping block 316. The transmitter 302 also includes a matrix equalizer 318 and a symbol demodulator/decoder unit 320 to perform demodulation and decoding of signals received via the antennas 306A-306N when in a receive mode. Additionally, the transmitter 302 includes a matrix calculation unit 322.

The controller 312 may assume a variety of configurations, and both the controller 312 and the matrix calculation unit 322 can be implemented as one or more standard multi-purpose, programmable processors, such as microprocessors, as application specific integrated circuits (ASICs), etc., and/or can be implemented using modules that may be composed from any other desired types of hardware, software and/or firmware. Likewise, the space-time mapping block 316 (i.e., beamforming network) and the matrix equalizer 318 may be implemented using modules as described in greater detail below. If desired, various of the transmitter components, such as the controller 310, the symbol encoder/modulator unit 314, the symbol demodulator/decoder unit 320, the matrix calculation unit 322, the space-time mapping block 316 and the matrix equalizer 318 may be implemented in the same or in different hardware devices, such as in the same or different processors and be supported and/or implemented as one or more modules.

Additionally, each of these components of the transmitter 302 may be disposed in a housing (shown in phantom in FIG. 3). Likewise, each of the components of the receiver 304 may also be disposed within a housing, which is also shown in phantom in FIG. 2. Still further, the routines or instructions for implementing the functionality of these components may be stored in the memory 312 or within other computer-readable media associated with the individual hardware used to implement these components, e.g., one or more processors to perform instructions of the computer-readable media.

During operation, information signals $T_{x1}$-$T_{xn}$ that are to be transmitted from the transmitter 302 to the receiver 304 are provided to the symbol encoder/modulator unit 314 for encoding and modulation. A variety of different numbers of signals $T_{x1}$-$T_{xn}$ may be provided to the symbol encoder/modulator unit 314, with this number generally being specified based on the modulation scheme used and/or the bandwidth associated with the MIMO communication system 300. Additionally, the signals $T_{x1}$-$T_{xn}$ may be a variety of different types of signals, including analog or digital signals, and may represent any desired type of data or information.

A sounding packet may be provided to the symbol encoder/modulator unit 314 for use in determining channel state information (CSI). The CSI describes characteristics of one or more channels between the transmitter 302 and the receiver 304. The same sounding packet or a different sounding packet may be used to determine the CSI for each frequency and/or spatial channel used in the MIMO communication system 300. The sounding packet may also be referred to as control signal $C_{x1}$ as previously described.

The symbol encoder/modulator unit 314 may interleave digital representations of the various signals $T_{x1}$-$T_{xn}$ and $C_{x1}$. The symbol encoder/modulator unit 314 may also perform other types of error-correction encoding on the signals $T_{x1}$-$T_{xn}$ and $C_{x1}$ to produce one or more streams of symbols to be modulated and sent from the transmitter 302 to the receiver 304. While the symbols can be modulated using any desired or suitable quadrature amplitude modulation (QAM) technique, such as using 64 QAM, these symbols can be modulated in any other known or desired manner including, for example, using other desired phase and/or frequency modulation techniques.

The modulated symbol streams are provided by the symbol encoder/modulator unit 314 to the space-time mapping block 316 for processing before being transmitted via the antennas 306A-306N. While not specifically shown in FIG. 3, the modulated symbol streams may be up-converted to the RF carrier frequencies associated with an orthogonal frequency division multiplexing (OFDM) technique (in one or more stages) before being processed by the space-time mapping block 316. Upon receiving the modulated signals, the space-time mapping block 316 processes the modulated signals by injecting delays and/or gains into the modulated signals based on a steering matrix provided by the controller 310 to thereby perform beamforming via the transmission antennas 306A-306N.

The signals transmitted by the transmitter 302 are detected by the receiver antennas 308A-308M and may be processed by a matrix equalizer 324 within the receiver 304 to enhance the reception capabilities of the antennas 308A-308M. Processing applied at the receiver 304 and/or at the transmitter 302 may be based on the CSI developed by the receiver 304 in response to the transmission of the sounding packet. In any event, a symbol demodulator/decoder unit 326, under control of a controller 328, may decode and demodulate the received symbol strings as processed by the matrix equalizer 324. In this process, these signals may be downconverted to baseband. Generally, the matrix equalizer 324 and the symbol demodulator/decoder unit 326 operate to remove effects of the channel based on the CSI as well as to perform demodulation on the received symbols to produce a digital bit stream. In some cases, if desired, the symbol demodulator/decoder unit 326 performs error correction decoding and deinterleaving on the bit stream to produce the received signals $R_{x1}$-$R_{xn}$ corresponding to the originally transmitted signals $T_{x1}$-$T_{xn}$.

The receiver 304 can also include a memory 330 and a symbol encoder/modulator unit 332 which can receive one or more signals $T_{R1}$-$T_{Rm}$ which can be encoded and modulated using any desired encoding and modulation techniques. The encoded and modulated symbol stream can then be upconverted and processed by a space-time mapping block 334 accordingly to beamforming techniques based on a steering matrix developed by a matrix calculation unit 336, prior to being transmitted via the receiver antennas 308A-308N to, for example, the transmitter 302, thereby implementing the reverse link. As shown in FIG. 3, each of the receiver 204 components may be disposed in a housing that is illustrated as a phantom box.

The matrix equalizer 318 and the demodulator/decoder unit 320 within the transmitter 302 may operate similarly to the matrix equalizer 324 and the demodulator/decoder unit 326 of the receiver 304. For example, matrix equalizer 318 and the demodulator/decoder unit 320 may demodulate and decode the signals transmitted by the receiver 304 to produce the recovered signals $R_{R1}$-$R_{Rm}$. Here again, the matrix equalizer 318 may process the received signals to enhance the separation and therefore the reception of the various signals transmitted by the antennas 308A-308M. The CSI for the various OFDM channels may be used by the matrix calculation units 322 and 336 as well as by the controllers 310 and 328 to perform beamforming and to generate a steering matrix to be used by the spacetime mapping blocks 316, 334. As noted above, the CSI, beamforming and other programs and data such as the steering matrix used by the units 322 and 336 and by the controllers 300 and 328 can be stored in the memories 312 and 320.

As previously described, directionally transmitting a data packet typically includes applying appropriate phases and gains to signals as sent through the multiple transmitter antennas 306A-306N, in a manner which causes the signals sent from the different transmitter antennas 306A-306N to constructively interact (add in phase) in certain predetermined directions and to deconstructively interact (cancel) in other directions. Thus, directional transmittal typically produces a beam pattern having high gain regions (referred to as high gain lobes) in various predetermined directions and low gain regions (typically referred to as nulls) in other directions.

The use of beamforming techniques in a MIMO system enables a signal to be sent with high gain (as compared to an omni-directional antenna) in certain directions, and to be sent with low gain (as compared to an omni-directional antenna) in other directions. Thus, in the MIMO system 300 of FIG. 3, beamforming can be used to enhance signal directivity towards the receiver antennas 308A-308M, which improves a signal-to-noise ratio (SNR) of transmissions and may therefore result in transmissions having increased reliability. In this case, the beamforming technique generally forms high gain lobes in a direction of propagation at which the highest gain is desired, and in particular in the directions of propagation from the transmitter 302 to each of the receiver antennas 308A-308M of the receiver 304.

The transmitter 302 is also illustrated as executing the beamforming module 112 on the controller 310, which is also storable in memory 312. Further, the memory 312 is illustrated as maintaining the codebook 122 and the steering matrices 124. The beamforming module 112 may be utilized in conjunction with the previously described sounding techniques to form a beamformed channel. For example, the beamforming module 122 may be executed on the controller 310 to cause a sounding packet to be transmitted using one or more of the spatial mapping matrices 124 included in the codebook 122 as previously described in relation to FIG. 1. A beamformed channel may then be implemented using a steering matrix formed as described above.

Thus, these techniques may be applied during the sounding procedure (e.g., to the sounding packet) to improve a probability of successful reception of the sounding packet, thereby extending the effective range of beamformed channels. For example, the beamforming techniques may employ the codebook 122 of spatial mapping matrices 124 to improve reliability and/or range of reception of a sounding packet by the receiver 104 without engaging in a training procedure and without knowledge of CSI.

As also described in relation to FIG. 2, these techniques may be applied during transmission of data packets (such as OFDM or single carrier) to improve reliability (e.g., packet error rate), data rate and/or range. In this example, since the spatial mapping matrix is formed with knowledge of CSI, the sounding procedure is not utilized thereby improving efficiency. The decision to hop from one of the steering matrices 124 to another may be made when a transmit data packet is not successfully received after one or more attempts.

Generally, any of the functions described herein can be implemented using hardware, software, firmware (e.g., fixed logic circuitry), manual processing, or a combination of these implementations. The terms "module," "functionality," and "logic" as used herein generally represent hardware, software, firmware, or a combination of hardware, software and firmware. In the case of a software implementation, the module, functionality, or logic represents executable instructions that perform specified tasks when executed on one or more processors (e.g., controllers). The executable instructions can be stored in one or more computer readable media, such as memory 120. The features of the beamforming techniques described below are platform-independent, meaning that the techniques may be implemented on a variety of commercial computing platforms having a variety of processors.

Example Procedures

Figure 4:
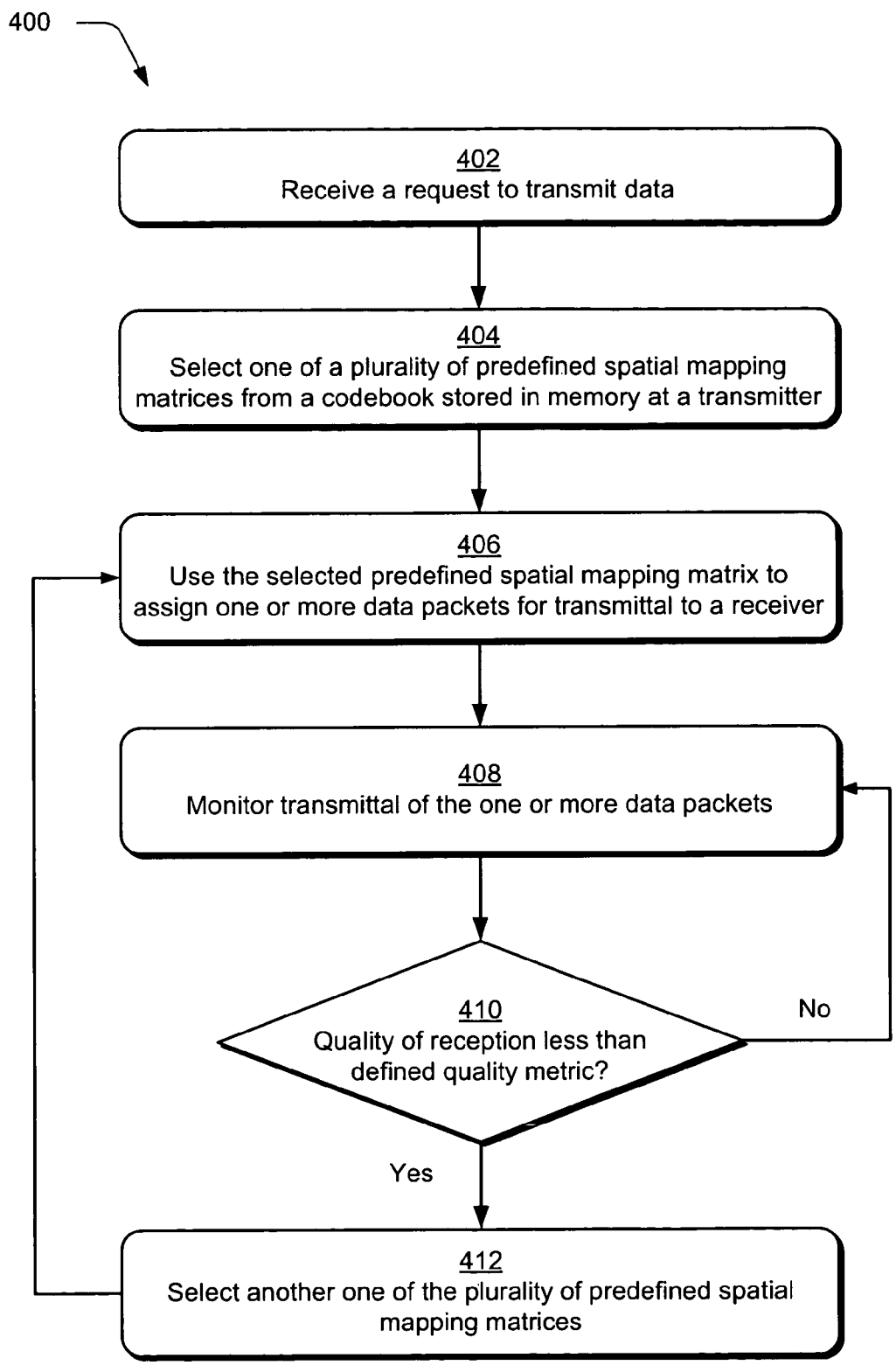
FIG. 4 is a flow chart depicting a procedure in an example implementation in which a predefined spatial mapping matrix is selected to transmit data packets.

FIG. 4 depicts a procedure 400 in an example implementation of a beam forming technique in which a predefined spatial mapping matrix is selected to transmit data packets. The following discussion may be implemented utilizing the previously described systems and devices, as well as other systems and devices subsequently described. Aspects of each of the procedures may be implemented in hardware, firmware, or software, or a combination thereof. The procedures are shown as a set of blocks that specify operations performed by one or more devices and are not necessarily limited to the order shown for performing the operations by the respective blocks.

A request to transmit data is received (block 402). For example, referring to FIG. 1, an application may provide data to the transmitter 102 to be transmitted to the receiver 104 over the wireless network 106.

One of a plurality of predefined spatial mapping matrices 124 are selected from a codebook 122 stored in memory 120 at the transmitter 102 (block 404). The selected predefined spatial mapping matrix 124 is then used to assign one or more data packets for transmittal to the receiver 104 (block 406). Transmittal of the one or more data packets is monitored (block 408). For example, the transmitter 102 may monitor as to whether an acknowledgement of successful transmission has been received from receiver 104, a data rate and/or packet error rate observed for the transmittal of the one or more data packets, and so on.

A determination is made as to whether a quality of reception is less than a defined quality metric 208 (decision block 410). If not (no from decision block 410), monitoring of the transmittal of the one or more data packets continues (block 408). When the quality of reception is less than the defined quality metric (yes from decision block 410), another one of the plurality of predefined spatial mapping matrices are selected (block 412). The procedure 400 then continues to block 406 such that the other predefined spatial mapping matrix is used (block 406), monitored (block 408) and a determination is made as to quality of reception (block 410). Thus, this procedure 400 may continue until a defined quality metric is met. A variety of other examples are also contemplated, such as to determine an optimal spatial mapping matrix as previously described. For example, the decision block 410 may be extended to the case that the defined quality metric 208 may be set infinitely high so that all the predefined spatial mapping matrices are hopped through one by one in block 412, meanwhile the quality of reception is still monitored by the receiver of these packets (e.g., receiver 104). In this example, the optimal spatial mapping matrix may be chosen based on the receiver's feedback on the quality on receiving each of these packets. In another application, the receiver selects the best spatial mapping matrix and provides feedback of the index to the transmitter.

The procedure 400 and its extension above may be applied in other wireless systems such as WiMax, 60 GHz Millimeter-Wave systems, and the like. The spatial mapping may be conducted in a digital circuit if multiple RF chains are used in the transmitter, or in an RF circuit (e.g., with phase shifters in the spatial mapping matrix) if only one RF chain and multiple antennas are used.

Figure 5:
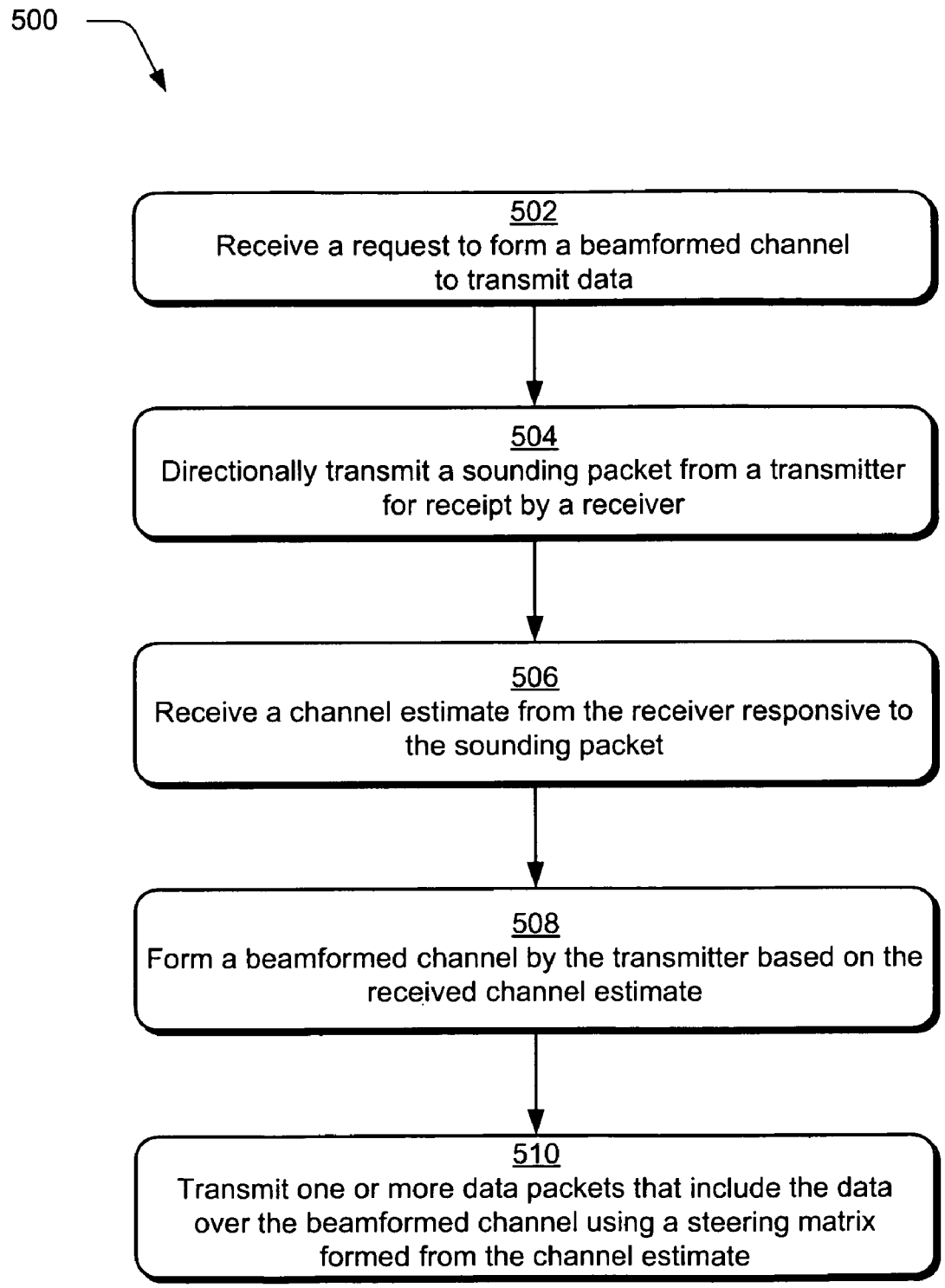
FIG. 5 is a flow chart depicting a procedure in an example implementation in which a sounding packet is directionally transmitted using a predefined spatial mapping matrix.

FIG. 5 depicts a procedure 500 in an example implementation of a beamforming technique in which a sounding packet is directionally transmitted using a predefined spatial mapping matrix. The following discussion may be implemented utilizing the previously described systems and devices, as well as other systems and devices subsequently described. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

A request is received to form a beamformed channel to transmit data (block 502). A sounding packet is directionally transmitted from a transmitter 102 for receipt by a receiver 104 (block 504). For example, the sounding packet may be directionally transmitted in compliance with a predefined spatial mapping matrix 124 included in a codebook 122 stored in memory 120 of the transmitter 102.

A channel estimate is received from the receiver 104 responsive to the sounding packet (block 506), such as a channel estimate (H) as previously described. A beamformed channel is formed by the transmitter 102 based on the received channel estimate (block 508), such as through use of a steering matrix generated from the channel estimate. One or more data packets are transmitted that include the data over the beamformed channel using the steering matrix formed from the channel estimate (block 510).

Example Devices

FIGS. 6-13 illustrate some examples of various devices that can each be implemented as any form of a device to implement various embodiments of the previously described techniques. The beamforming techniques described above can be utilized in various devices having multiple antennas. For example, the selection of spatial mapping matrix from a codebook to perform beamforming techniques described above may be utilized in base stations, access points, wireless routers, and so forth. For example, any of the various devices can be implemented as a device that employs the above described techniques for wireless communication. The techniques may be employed within signal processing and/or control functionality of the devices, control systems of the devices, and so on, examples of which are as follows.

Figure 6:
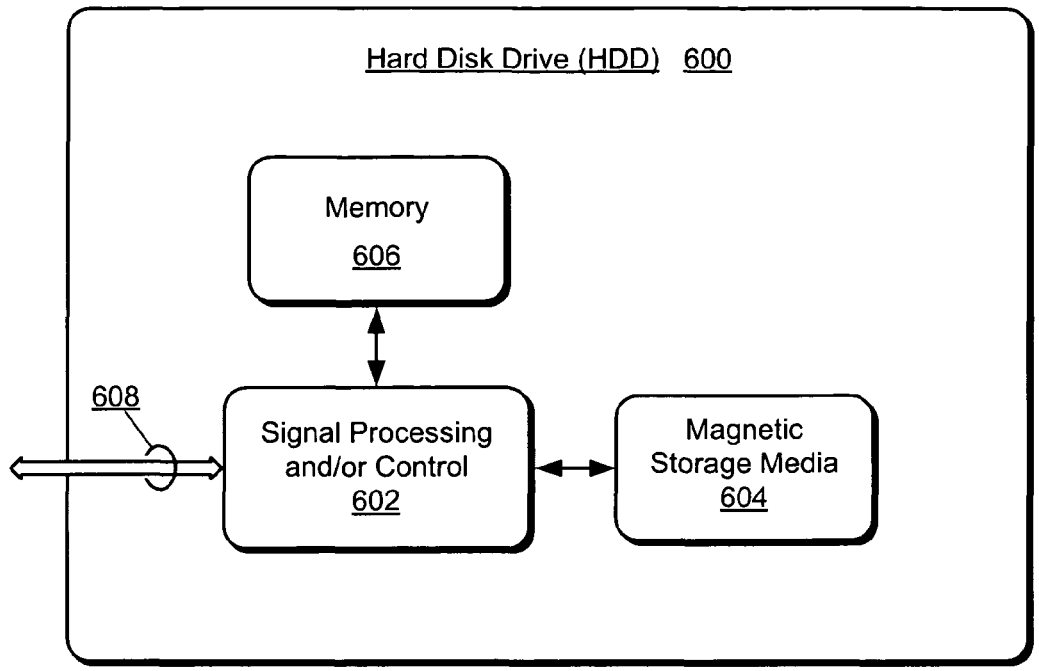
FIGS. 6-13 illustrate various implementations of example devices that can employ beamforming techniques described herein in accordance with one or more implementations.

FIG. 6 illustrates an example device that may be embodied as a hard disk drive (HDD) 600, which includes signal processing and/or control circuit(s) generally identified at 602 that may include wireless functionality. The HDD 600 can also include a magnetic storage media 604 and/or a memory 606, such as random access memory (RAM), a low-latency nonvolatile memory such as flash memory, read only memory (ROM), and/or other suitable electronic data storage. In various implementations, the signal processing and/or control circuit(s) 602 can be implemented to process data (e.g., any of encoding, decoding, encryption, and/or decryption), perform data calculations, and/or format data. The data can be output to and/or received from at least the magnetic storage media 604 and/or the memory 606. In addition, the HDD 600 can communicate with a host device (not shown) such as a computer or mobile computing devices, such as a personal digital assistant, cellular phone, media or MP3 player, and/or other devices via one or more wired or wireless communication links 608.

Figure 7:
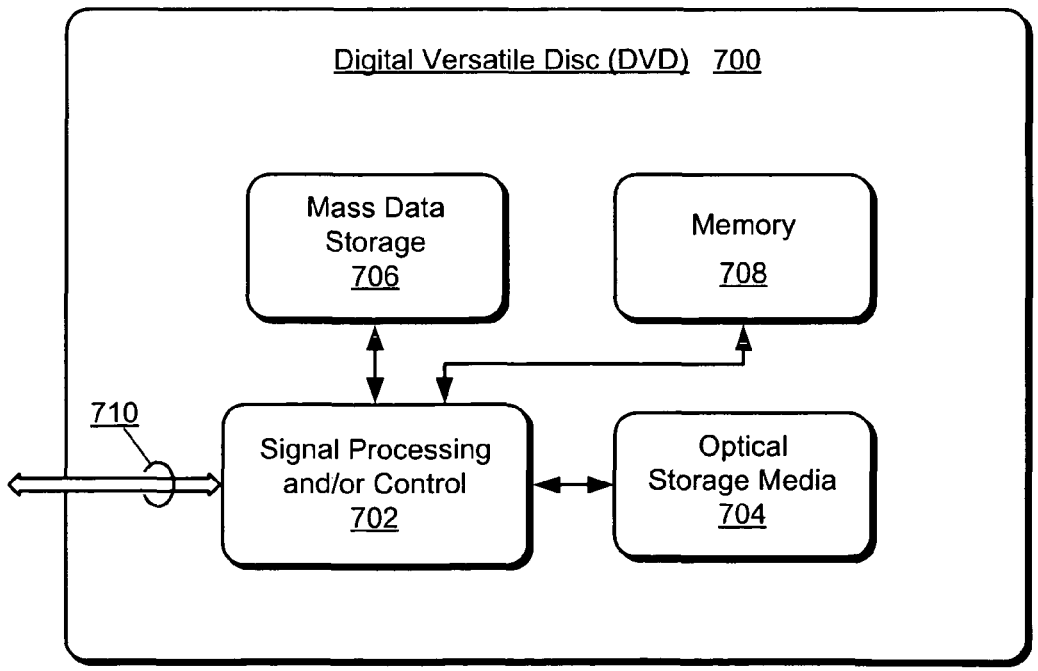

FIG. 7 illustrates an example device that may be embodied as a digital versatile disc (DVD) drive 700, which includes signal processing and/or control circuit(s) generally identified at 702. The DVD drive 700 can also include an optical storage media 704, mass data storage 706, and/or a memory 708, such as random access memory (RAM), a low-latency nonvolatile memory such as flash memory, read only memory (ROM), and/or other suitable electronic data storage. The mass data storage 706 can store data in a nonvolatile manner, and may include a hard disk drive (HDD) such as described with reference to FIG. 6, which may be a mini HDD that includes one or more platters having a diameter that is smaller than approximately 1.8 inches. Further, DVD drive 700 may be configured as part of another device, such as included as part of a game console having wireless functionality incorporated within the signal processing and/or control circuit(s) generally identified at 702.

In various implementations, the signal processing and/or control circuit(s) 702 can be implemented to process data (e.g., any of encoding, decoding, encryption, and/or decryption), perform data calculations, format data, and/or any other signal processing functions associated with a DVD drive. The data can be written to and/or read from at least the optical storage media 704 and/or the memory 708. In addition, the DVD drive 700 can communicate with an output device (not shown) such as a computer, television, and/or other devices via one or more wired or wireless communication links 710.

Figure 8:
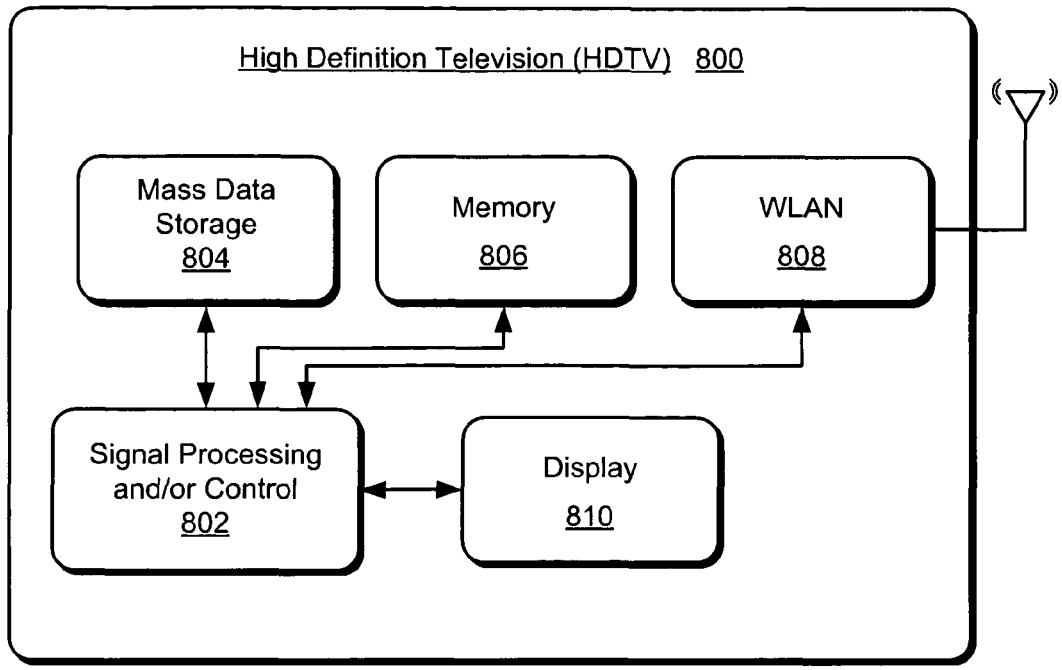

FIG. 8 illustrates an example device that may be embodied as a high definition television (HDTV) 800, which includes signal processing and/or control circuit(s) generally identified at 802. The HDTV 800 can also include mass data storage 804 and/or a memory 806, such as random access memory (RAM), a low-latency nonvolatile memory such as flash memory, read only memory (ROM), and/or other suitable electronic data storage. The mass data storage 804 can store data in a nonvolatile manner, and may include an optical storage media as described with reference to FIG. 7, and/or a drive as described with reference to FIG. 6, which may be a mini HDD.

In various implementations, the signal processing and/or control circuit(s) 802 can be implemented to process data (e.g., any of encoding, decoding, encryption, and/or decryption), perform data calculations, format data, and/or any other signal processing functions associated with an HDTV. The data can be output to and/or received from at least the memory 806. In addition, the HDTV 800 includes a wireless local area network (WLAN) interface 808 via which input signals can be received in either a wired or wireless format. HDTV output signals can be generated for a display 810.

Figure 9:
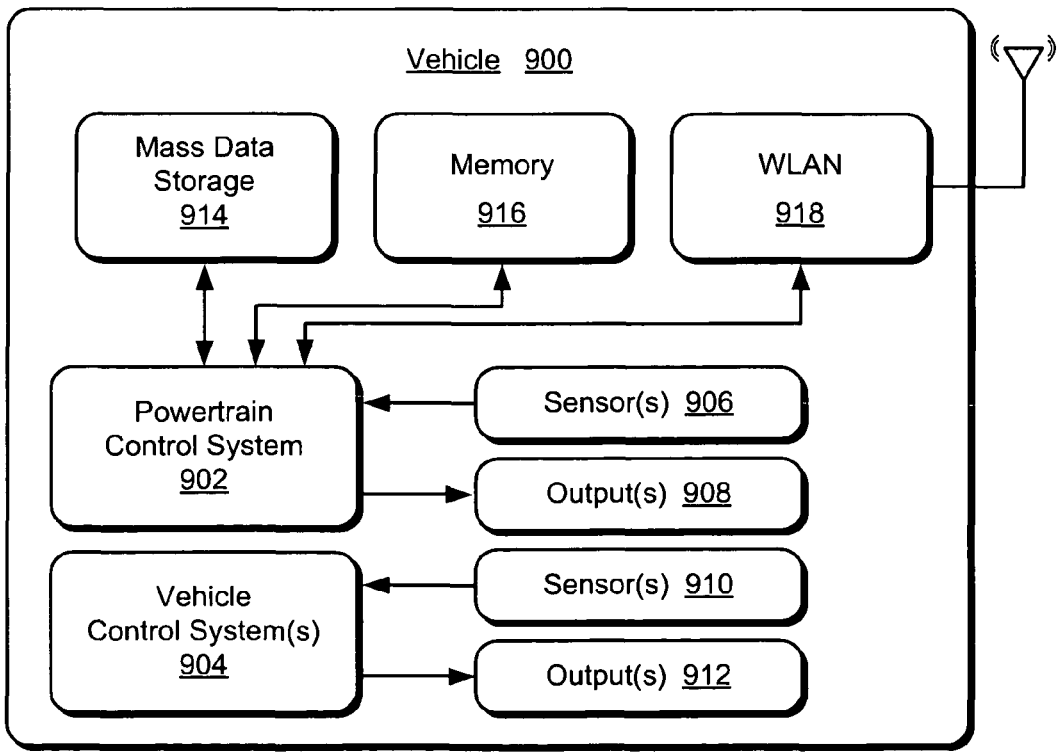

FIG. 9 illustrates an example device that may be embodied as a vehicle 900, which includes a powertrain control system 902 and, optionally, additional vehicle control system(s) 904. The powertrain control system 902 can receive data inputs from one or more sensors 906 such as temperature sensors, pressure sensors, rotational sensors, airflow sensors, and/or any other suitable sensors. The powertrain control system 902 can receive the data inputs and generate one or more output control signals 908, such as engine operating parameters, transmission operating parameters, braking parameters, and/or other control signals.

Additional control system(s) 904 may likewise receive data signals from one or more input sensors 910 and/or generate output control signals 912 to one or more output devices. In various implementations, a control system 904 may be part of an anti-lock braking system (ABS), a navigation system, a telematics system, a vehicle telematics system, a lane departure system, an adaptive cruise control system, and/or a vehicle entertainment system such as a stereo, DVD, compact disc, and the like.

The vehicle 900 can also include mass data storage 914 and/or a memory 916, such as random access memory (RAM), a low-latency nonvolatile memory such as flash memory, read only memory (ROM), and/or other suitable electronic data storage. The mass data storage 914 can store data in a nonvolatile manner, and may include an optical storage media as described with reference to FIG. 7, and/or a drive as described with reference to FIG. 6, which may be a mini HDD. In addition, vehicle 900 includes a wireless local area network (WLAN) interface 918 via which input signals can be received in either a wired or wireless format. The powertrain control system 902 also may support connections with a WLAN via the WLAN interface 918.

Figure 10:
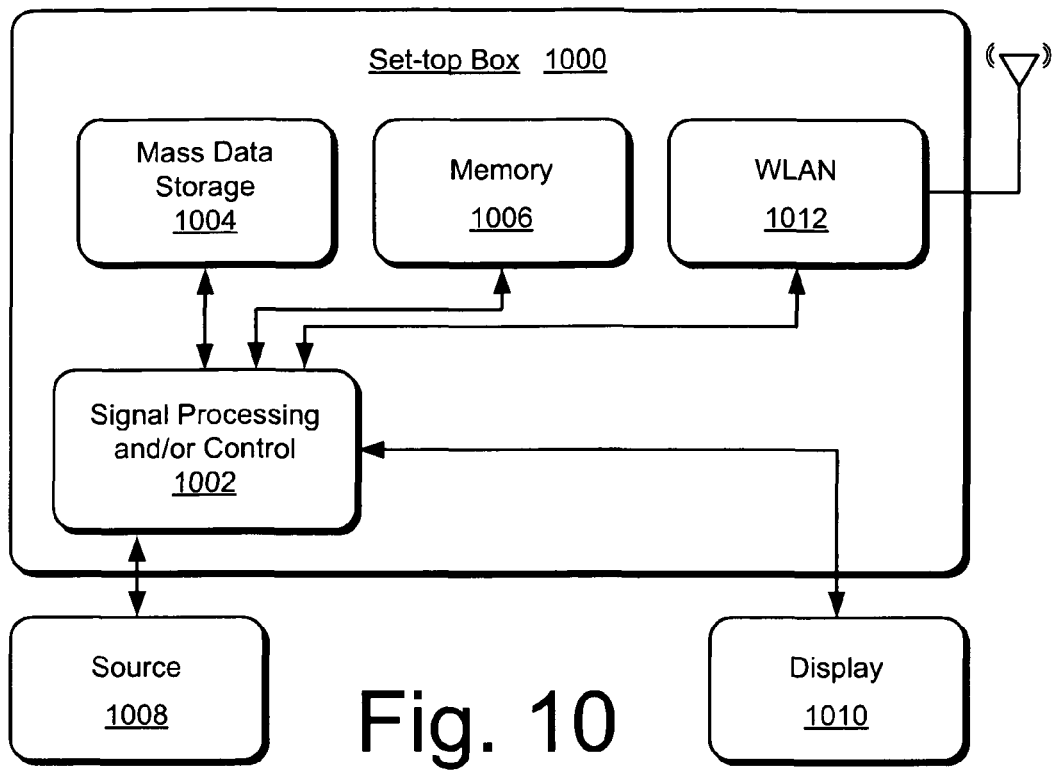

FIG. 10 illustrates an example device that may be embodied as a television set-top box 1000, which includes signal processing and/or control circuit(s) generally identified at 1002. The set-top box 1000 can also include mass data storage 1004 and/or a memory 1006, such as random access memory (RAM), a low-latency nonvolatile memory such as flash memory, read only memory (ROM), and/or other suitable electronic data storage. The mass data storage 1004 can store data in a nonvolatile manner, and may include an optical storage media as described with reference to FIG. 7, and/or a drive as described with reference to FIG. 6, which may be a mini HDD.

The set top box 1000 can receive data signals from a source 1008, such as a broadband source, and can then output standard and/or high definition audio/video signals suitable for a display 1010, such as a television, monitor, and/or other video and/or audio output devices. In various implementations, the signal processing and/or control circuit(s) 1002 can be implemented to process data (e.g., any of encoding, decoding, encryption, and/or decryption), perform data calculations, format data, and/or any other signal processing functions associated with a television set-top box. The data can be output to and/or received from at least the memory 1006 and/or the source 1008. In addition, the set-top box 1000 includes a wireless local area network (WLAN) interface 1012 via which input signals can be received in either a wired or wireless format. The set-top box 1000 may also support connections with a WLAN via the WLAN interface 1012.

Figure 11:
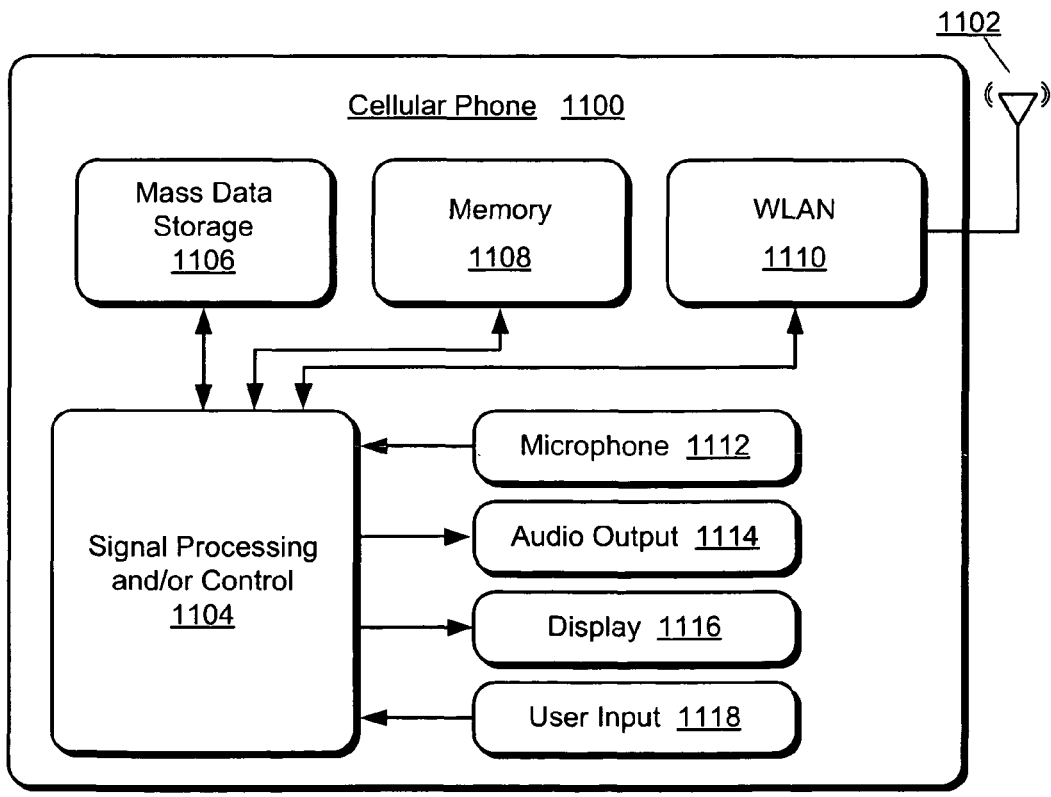

FIG. 11 illustrates an example device that may be embodied as a cellular phone 1100, which includes a cellular antenna 1102 and signal processing and/or control circuit(s) generally identified at 1104. The cellular phone 1100 can also include mass data storage 1106 and/or a memory 1108, such as random access memory (RAM), a low-latency nonvolatile memory such as flash memory, read only memory (ROM), and/or other suitable electronic data storage. The mass data storage 1106 can store data in a nonvolatile manner, and may include an optical storage media as described with reference to FIG. 7, and/or a drive as described with reference to FIG. 6, which may be a mini HDD.

Figure 12:
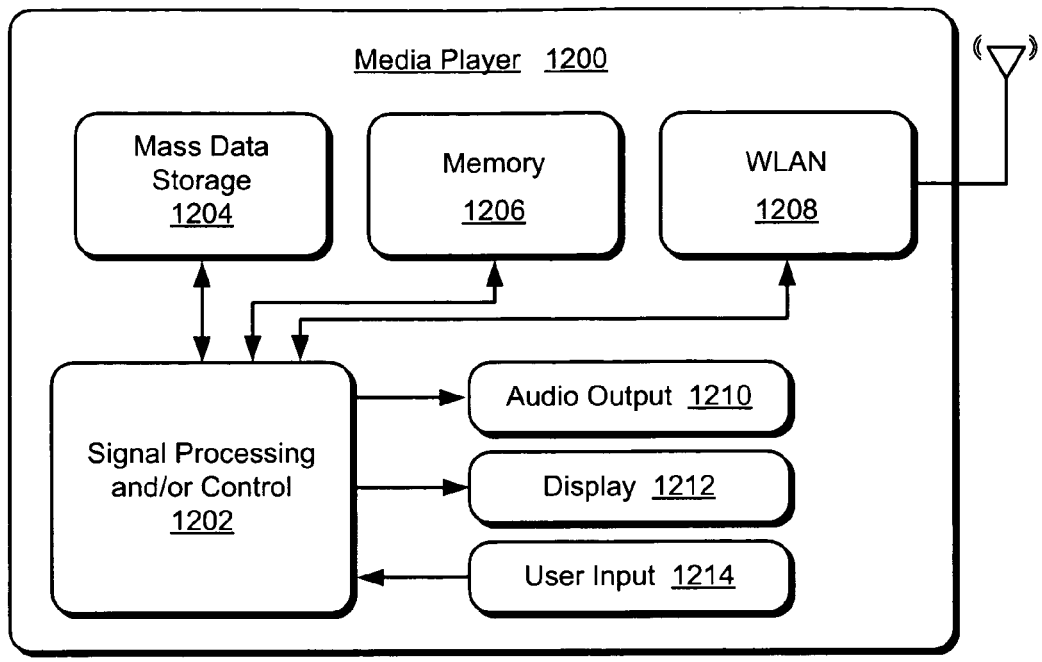

In various implementations, the signal processing and/or control circuit(s) 1104 can be implemented to process data (e.g., any of encoding, decoding, encryption, and/or decryption), perform data calculations, format data, and/or any other signal processing functions associated with a cellular phone. The data can be output to and/or received from at least the memory 1108. In addition, the cellular phone 1100 includes a wireless local area network (WLAN) interface 1110 via which input signals can be received in a wireless format. The cellular phone 1100 may also support connections with a WLAN via the WLAN interface 1110. In some implementations, the cellular phone 1100 can include a microphone 1112, an audio output 1114 such as a speaker and/or audio output jack, a display 1116, and/or an input device 1118 such as a keypad, pointing device, voice actuation, and/or other input device. D FIG. 12 illustrates an example device that may be embodied as a media player 1200, which includes signal processing and/or control circuit(s) generally identified at 1202. The media player 1200 can also include mass data storage 1204 and/or a memory 1206, such as random access memory (RAM), a low-latency nonvolatile memory such as flash memory, read only memory (ROM), and/or other suitable electronic data storage. The mass data storage 1204 can store data, such as compressed audio and/or video content, in a nonvolatile manner. In some implementations, compressed audio files include files that are compliant with an MP3 format or other suitable compressed audio and/or video formats. The mass data storage 1204 may include an optical storage media as described with reference to FIG. 7, and/or a drive as described with reference to FIG. 6, which may be a mini HDD.

In various implementations, the signal processing and/or control circuit(s) 1202 can be implemented to process data (e.g., any of encoding, decoding, encryption, and/or decryption), perform data calculations, format data, and/or any other signal processing functions associated with a media player. The data can be output to and/or received from at least the memory 1206. In addition, the media player 1200 includes a wireless local area network (WLAN) interface 1208 via which input signals can be received in either a wired or wireless format. The media player 1200 may also support connections with a WLAN via the WLAN interface 1208. In some implementations, the media player 1200 can include an audio output 1210 such as a speaker and/or audio output jack, a display 1212, and/or an input device 1214 such as a keypad, touchpad, pointing device, voice actuation, and/or other input device. In various implementations, media player 1200 may employ a graphical user interface (GUI) that typically includes menus, drop down menus, icons, and/or a point-and-click interface via display 1212 and/or user input 1214.

Figure 13:
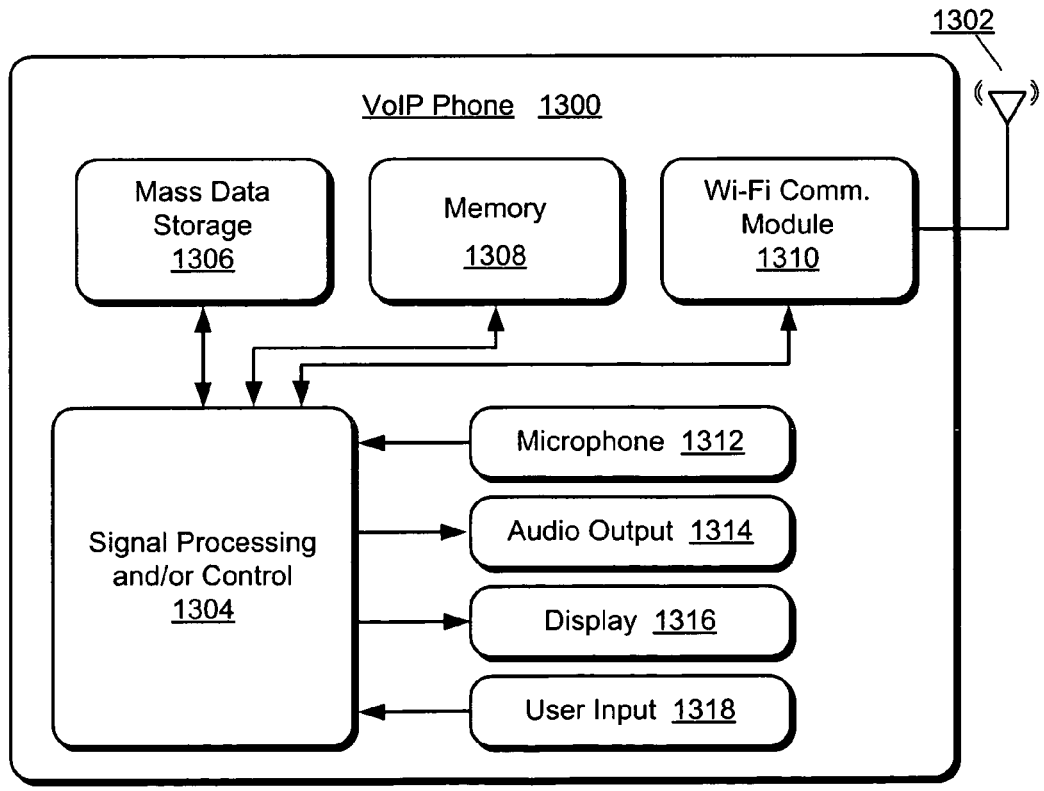

FIG. 13 illustrates an example device that may be embodied as a Voice over Internet Protocol (VoIP) phone 1300, which includes an antenna 1302 and/or is implemented in connection with a VoIP box that enables a conventional telephone to be plugged in and utilized with VoIP technology. The VoIP phone 1300 also includes signal processing and/or control circuit(s) generally identified at 1304. The VoIP phone 1300 can also include mass data storage 1306 and/or a memory 1308, such as random access memory (RAM), a low-latency nonvolatile memory such as flash memory, read only memory (ROM), and/or other suitable electronic data storage. The mass data storage 1306 can store data in a nonvolatile manner, and may include an optical storage media as described with reference to FIG. 7, and/or a drive as described with reference to FIG. 6, which may be a mini HDD.

In various implementations, the signal processing and/or control circuit(s) 1304 can be implemented to process data (e.g., any of encoding, decoding, encryption, and/or decryption), perform data calculations, format data, and/or any other signal processing functions associated with a VoIP phone. The data can be output to and/or received from at least the memory 1308. In addition, the VoIP phone 1300 includes a Wireless Fidelity (Wi-Fi) communication module 1310 via which communication links with a VoIP network can be established. In some implementations, the VoIP phone 1300 can include a microphone 1312, an audio output 1314 such as a speaker and/or audio output jack, a display 1316, and/or an input device 1318 such as a keypad, pointing device, voice actuation, and/or other input device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   storing, in a memory, predefined spatial mapping matrices useful for transmitting data packets to a receiver;
   sequentially transmitting one or more of the data packets to the receiver, each act of transmitting using a different one of the predefined spatial mapping matrices stored in the memory;
   selecting one of the predefined spatial mapping matrices stored in the memory for use in a subsequent act of transmitting one or more additional data packets to the receiver, the selecting one of the predefined spatial mapping matrices based on a quality of reception of the one or more of the data packets sequentially transmitted to the receiver; and
   selecting another one of the predefined spatial mapping matrices when a packet error rate associated with the one or more additional data packets of the subsequent act of transmitting exceeds a defined error rate threshold or when a data rate of the one or more additional data packets of the subsequent act of transmitting does not meet a defined data rate threshold.

2. The method as described in claim 1, wherein each of the predefined spatial mapping matrices is configured to perform a transmission in a different direction.

3. The method as described in claim 1, wherein each of the predefined spatial mapping matrices is stored in a codebook at a transmitter, and wherein the codebook is maintained by the memory.

4. The method as described in claim 1, wherein the one or more additional data packets are assigned to the one of the predefined spatial mapping matrices without channel training.

5. A method comprising:
   transmitting a sounding packet using beamforming from a transmitter for receipt by a receiver, the transmitting iteratively performed in different directions until a channel estimate is received;

receiving the channel estimate from the receiver responsive to the sounding packet; and forming a beamformed channel by the transmitter based on the received channel estimate.

6. The method as described in claim 5, wherein the transmitting is iteratively performed by the transmitter in different directions until an acknowledgment is received at the transmitter that the sounding packet has been received by the receiver.

7. The method as described in claim 5, wherein the different directions are defined through different predefined spatial mapping matrices that are stored at the transmitter.

8. The method as described in claim 5, wherein the transmitting includes:

using a predefined spatial mapping matrix to perform the beamforming; and selecting another predefined spatial mapping matrix when the transmitter determines that the sounding packet has not been received by the receiver.

9. The method as described in claim 8, wherein the transmitter determines that the sounding packet has not been received by the receiver when an acknowledgment has not been received at the transmitter from the receiver.

10. The method as described in claim 5, wherein the forming includes generating a steering matrix using the channel estimate.

11. The method as described in claim 5, wherein the directional transmitting is performed without channel training.

12. An apparatus comprising:

one or more antennas configured for directional transmissions;

memory configured to maintain a codebook having predefined spatial mapping matrices useful for beamforming; and a transmission controller configured to:

iteratively transmit via the one or more antennas sounding packets in different directions using beamforming until a channel estimate is received;

receive the channel estimate from a receiver responsive to one of the sounding packets; and form a beamformed channel with the one or more antennas based on the received channel estimate.

13. The apparatus as recited in claim 12, wherein the transmission controller is further configured to form the beamformed channel by generating a steering matrix using the channel estimate.

14. The apparatus as recited in claim 12, wherein each of the predefined spatial mapping matrices is configured to transmit using a different direction respectively.

15. The apparatus as recited in claim 12, wherein the transmission controller is further configured to transmit in the different directions without channel training.

16. A system comprising:

one or more antennas configured for directional transmissions;

memory configured to maintain a codebook having predefined spatial mapping matrices; and a transmission controller configured to:

directionally transmit, via the one or more antennas, a sounding packet to a receiver using one of the predefined spatial mapping matrices; and select another one of the predefined spatial mapping matrices to directionally retransmit the sounding packet in a different direction when it is determined that the sounding packet has not been received by the receiver; or form a beamformed channel based on a channel estimate obtained from the receiver responsive to the sounding packet.

17. The system as described in claim 16, wherein the transmission controller is further configured to iteratively transmit the sounding packet using different predefined spatial mapping matrices until an acknowledgment is received from the receiver.

18. The system as described in claim 16, wherein the transmission controller is further configured to repeatedly transmit the sounding packet using different predefined spatial mapping matrices until the channel estimate is received.

19. The system as described in claim 16, wherein the transmission controller is further configured to form the beamformed channel by generating a steering matrix using the channel estimate.

20. The system as described in claim 16, wherein the transmission controller is further configured to determine that the sounding packet has not been received by the receiver when an acknowledgment has not been received.

21. The system as described in claim 16, wherein the sounding packet is directionally transmitted without channel training.

* * * * *